United States Patent Office 2,967,193
Patented Jan. 3, 1961

2,967,193
NITRAZA DIISOCYANATES

Karl Klager, Monrovia, and Clinton R. Vanneman, Claremont, Calif., assignors to Aerojet-General Corporation, Azusa, Calif., a corporation of Ohio No Drawing. Filed July 8, 1955, Ser. No. 520,914

16 Claims. (Cl. 260—453)

This invention relates to new compositions of matter and a method for their preparation. In particular, it relates to nitraza diisocyanates having the general formula:

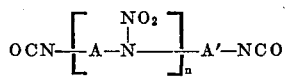

wherein A and A' are alkylene radicals and $n$ is a small whole number.

This application is a continuation in part of our copending application No. 438,294, filed June 21, 1954, now abandoned.

The diisocyanates of this invention readily react with nitroalcohols such as 2,2,2-trinitroethanol to produce valuable high explosive compositions as disclosed in assignee's copending application No. 464,610, filed October 25, 1954.

The isocyanates of this invention are prepared by reacting corresponding diacyl halides with an azide of an alkali or alkaline earth metal and subsequently or concurrently heating under anhydrous conditions to effect rearrangement, as illustrated by the general reaction scheme set forth below:

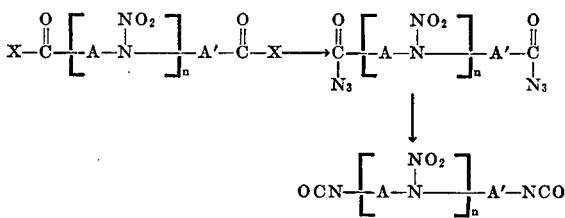

wherein X is a halogen radical and A, A' and $n$ are as defined above.

The acid halides used as starting materials in this invention are obtained by reacting the corresponding acids with thionyl chloride, phosphorous halides, or similar reagents. The acids are prepared by hydrolyzing the corresponding nitriles, as disclosed in our copending application No. 438,296, filed June 21, 1954, now abandoned.

To more fully illustrate this invention, the following examples are presented. It is to be understood, however, that these examples are presented merely as a means of illustration and are not intended to limit the scope of the invention in any way.

EXAMPLE I

Preparation of 3-nitraza-1,5-pentane diisocyanate

A solution of 121.5 gm. (0.5 mole) 4-nitraza-1,7-heptanedioyl chloride in 875 ml. dry, alcohol-free chloroform was added slowly to a solution of 97.5 gm. (1.5 moles) sodium azide in 250 ml. water with vigorous stirring while the temperature was maintained at 0–5° C. The resulting mixture was then stirred for an additional 45 minutes. The resulting two-phase mixture was separated. The chloroform phase was further diluted with chloroform, washed with ice water, and dried over anhydrous calcium sulfate. The drying agent was removed by filtration, additional dry chloroform was added to the filtrate, and the chloroform solution was distilled briefly in vacuo to insure complete removal of all moisture. The anhydrous solution was then warmed to a temperature of about 50–55° C. Upon completion of the rearrangement the solvent was distilled in vacuo and the oily residue was treated on the steambath with a mixture of dry, alcohol-free chloroform and absolute ether. The product crystallized from the near-colorless solution upon chilling, and was separated by filtration, washed with cold ether, and dried over phosphorous pentoxide. The colorless crystalline product, M.P. 25–26° C., was obtained in 72.5% yield having a purity of 99%. The elemental analysis of the product is as follows:

Calculated for $C_6H_8O_4N_4$: percent C, 36.00; percent H, 4.04; percent N, 27.99. Found: percent C, 35.70; percent H, 4.02; percent N, 28.83.

EXAMPLE II

Preparation of 3,6-dinitraza-1,8-octane diisocyanate

To a solution of 26.6 gm. (0.41 mole) sodium azide in 300 ml. water was slowly added a solution of 45 gm. (0.136 mole) 4,7-dinitraza-1,10-decanedioyl chloride in 300 ml. acetone at 5–10° C. The resulting mixture was stirred for 20 minutes and filtered. The precipitate was washed successively with water, methanol, and absolute ether. The azide was then transferred to a distilling flask, ethylene dichloride was added, and the last traces of moisture were removed in an azeotropic distillation under reduced pressure. Additional dry ethylene dichloride was added to the slurry and the azide rearrangement was induced by warming this mixture at atmospheric pressure. The product was partially precipitated by concentrating the solution by distillation at reduced pressure. The mixture was thoroughly chilled and absolute ether was added to further diminish the solubility of the product. The solid material was separated by filtration, washed with absolute ether, and recrystallized from ethylene dichloride. The 3,6-dinitraza-1,8-octane diisocyanate was obtained in 76.5% yield having a purity of 97.3%; M.P. 91.5–93° C. The elemental analysis of the product is as follows:

Calculated for $C_8H_{12}O_6N_6$: percent C, 33.33; percent H, 4.20; percent N, 29.16. Found: percent C, 33.58; percent H, 4.35; percent N, 30.02.

EXAMPLE III

Preparation of 2-nitraza-1,4-butane diisocyanate

A solution of 229 gm. (1 mole) 3-nitraza-1,6-hexanedioyl chloride in 1 liter dry, alcohol-free chloroform was added over a period of 15–20 minutes with vigorous stirring to a solution of 198 gm. (3 moles) sodium azide in 500 ml. water, while maintaining the temperature of the mixture at about 5° C. The mixture was stirred for an additional 1.5 hours at a temperature of about 10° C. The mixture was separated and the aqueous phase was further diluted and then extracted with chloroform. The chloroform solutions were combined, washed with sodium bicarbonate and water, and dried. The diazide was then rearranged by warming the solution on the steambath for a period of about 1 hour. The chloroform was removed by distillation under reduced pressure. The product was purified by recrystallization from absolute ether using low-temperature techniques. The diisocyanate, a faintly yellow liquid M.P. about 1–2° C., was obtained in 70–75% yield with an assay showing greater than 98% diisocyanate. The elemental analysis of the product is as follows:

Calculated for $C_5H_6O_4N_4$: percent C, 32.26; percent H, 3.25; percent N, 30.10. Found: percent C, 32.20; percent H, 3.06; percent N, 30.08.

EXAMPLE IV

*Preparation of 3,10-dinitraza-1,12-dodecane diisocyanate*

A solution of 27 gm. (0.07 mole) 4,11-dinitraza-1,14-tetradecanedioyl chloride in 150 ml. dry ethylene dichloride was added in a fine stream to a vigorously stirred solution of 13.7 gm. (0.21 mole) sodium azide in 35 ml. water at 5° C. during a 15 minute period. The mixture was immersed in an ice bath and stirring was continued for 75 minutes. The 4,11-dinitraza-1,14-tetradecanedioyl azide was removed by filtration, washed successively with ice water, methanol, and absolute ether, and transferred to a flask for rearrangement. On the addition of 250 ml. dry ethylene dichloride to the 21 gm. diazide (very slightly damp with ether), the material dissolved. The solution was distilled briefly in vacuo (100 ml. distillate), and the azide was rearranged on warming the solution on the steambath at atmospheric pressure. With the evolution of nitrogen complete, the solvent was distilled in vacuo. The solid residue was triturated with absolute ether, filtered, and dried to yield 15.7 gm. crude 3,10-dinitraza-1,12-dodecane diisocyanate. Recrystallization from an ethylene dichloride-ether solution gave a near-colorless product melting at 75–76° C. The elemental analysis of the product is as follows:

Calculated for $C_{12}H_{20}O_6N_6$: percent C, 41.85; percent H, 5.85; percent N, 24.41. Found: percent C, 41.54; percent H, 5.59; percent N, 24.86.

EXAMPLE V

*Preparation of 3,7-dinitraza-1,9-nonane diisocyanate*

A solution of 37.7 gm. (0.1 mole) 4,8-dinitraza-1,11-undecanedioyl chloride in 225 ml. dry, alcohol-free chloroform was added in a fine stream with vigorous stirring to a solution of 19.5 gm. (0.3 mole) sodium azide in 50 ml. water at 5–10° C. The temperature was held at 5° C. by means of an ice bath while the two-phase mixture was stirred for 1.5 hours. The reaction mixture was further diluted with 200 ml. chloroform and 50 ml. water, and the aqueous phase was discarded. The chloroform layer was washed with 100 ml. 5% sodium carbonate solution and four times with 100 ml. ice water. The chloroform solution was dried over anhydrous sodium sulfate, diluted with additional dry chloroform, and distilled briefly in vacuo to insure complete removal of moisture. The 4,8-dinitraza-1,11-undecanedioyl azide was then rearranged on warming the solution on the steambath at atmospheric pressure. When decomposition was complete, the solvent was removed by distillation in vacuo to yield 30.6 gm. crude 3,7-dinitraza-1,9-nonane diisocyanate as a faint yellow, viscous residue. On storage in a deep freeze, the product crystallized. The diisocyanate was triturated with absolute ether and dried to yield material melting at about 35° C. The elemental analysis of the product is as follows:

Calculated for $C_9H_{14}N_6O_6$: percent C, 35.76; percent H, 4.67; percent N, 27.81. Found: percent C, 35.92; percent H, 4.58; percent N, 28.46.

EXAMPLE VI

*Preparation of 3,6,9-trinitraza-1,11-undecane diisocyanate*

A solution of 45.1 gm. (0.1 mole) 4,7,10-trinitraza-1,13-tridecanedioyl chloride in 235 ml. acetone was diluted with 50 ml. glacial acetic acid and 26 gm. (0.4 mole) powdered sodium azide was added portion-wise with vigorous stirring during a 10 minute period while the temperature was held at 20–25° C. The mixture was stirred for one hour at 25° C., chilled to 10° C., and diluted with 600 ml. ice water. The separation of the product by filtration and subsequent washings with methanol and absolute ether were extremely slow. The precipitate was slurried in 650 ml. dry ethylene dichloride and ca. 200 ml. solvent was distilled in vacuo to insure complete removal of moisture. The 4,7,10-trinitraza-1,13-tridecanedioyl azide was then rearranged by warming the mixture on the steambath at atmospheric pressure. The solution was concentrated to near-dryness, diluted with absolute ether, and filtered. The crude diisocyanate was treated with a large volume of hot methylene chloride, filtered to remove the more highly colored material which failed to dissolve, and then evaporated to near-dryness. On chilling the solution, the diisocyanate crystallized and was separated by filtration and washed with absolute ether. The diisocyanate melted over a range, 90–95° C. Additional recrystallizations were made by dissolving the diisocyanate in methylene chloride and reprecipitating by the addition of absolute ether. The melting point was not improved. The elemental analysis of the product is as follows:

Calculated for $C_{10}H_{16}N_8O_8$: percent C, 31.92; percent H, 4.29; percent N, 29.78. Found: percent C, 31.17; percent H, 4.22; percent N, 29.70.

EXAMPLE VII

*Preparation of 2,5-dinitraza-1,6-hexane diisocyanate*

A solution of 19.7 gm. (0.065 mole) 3,6-dinitraza-1,8-octanedioyl chloride in 300 ml. ethylene dichloride was added in a fine stream with vigorous stirring to a solution of 13 gm. (0.2 mole) sodium azide in 35 ml. water while the temperature was held at 5–10° C. The mixture was allowed to stir for 1.5 hours at 5° C., and the dense crystals of the 3,6-dinitraza-1,8-octanedioyl azide were removed by filtration and washed successively with ice water, methanol, and absolute ether. The azide was dampened with ethylene dichloride, transferred to a distilling flask, and suspended in 300 ml. ethylene dichloride. A portion of the solvent was removed by distillation in vacuo to insure complete removal of moisture, and the azide was then rearranged on warming the mixture on the steambath at atmospheric pressure. The azide dissolved at 45–50° C. and decomposition began at 60–65° C. Heating was continued for 45 minutes, and the solvent was distilled in vacuo until crystals of the diisocyanate began to separate from solution. The mixture was then chilled, and the diisocyanate was collected by filtration, washed with absolute ether, and dried. The diisocyanate weighed 9.5 gm. and melted at 95–98° C. Two recrystallizations from ethylene dichloride raised the melting point to 90–100° C. The elemental analysis of the product is as follows:

Calculated for $C_6H_8O_6N_6$: percent C, 27.70; percent H, 3.10; percent N, 32.31. Found: percent C, 27.70; percent H, 3.21; percent N, 31.90.

Due to convenience and cost, it is preferred to employ the nitraza diacid chlorides as starting materials for the preparation of the nitraza diisocyanates of this invention.

The particular temperatures and solvents used in the examples are not critical in the practice of this invention. Any inert organic solvent can be used. Lower temperatures can be used if desired, however the reactions proceed more slowly under these conditions; conversely higher temperatures render the reactions difficult to control and tend to reduce yields.

We have also found that by reacting acid halides such as 3-nitraza-1,5-pentanedioyl chloride, 3,5-dinitraza-1,7-heptanedioyl chloride, 4,6-dinitraza-1,9-nonanedioyl chloride, and 4,8,12-trinitraza-1,15-pentadecanedioyl chloride with sodium azide, these compounds undergo rearrangement to produce 2-nitraza-1,3-propane diisocyanate, 2,4-dinitraza-1,5-pentane diisocyanate, 3,5-dinitraza-1,7-heptane diisocyanate, and 3,7,11-trinitraza-1,13-tridecane diisocyanate. Higher molecular weight diisocyanates, including those having at least as many as six nitraza-alkylene units, can be prepared in the manner disclosed, merely by using their corresponding high molecular weight acid halides as starting materials.

From the above discussion it is apparent that any member of the nitraza diisocyanate series disclosed can be prepared by merely selecting an appropriate nitraza diacid halide, reacting it with a metallic azide and allowing the subsequent rearrangement to take place under anhydrous conditions, in accordance with the teachings of this invention.

We claim:

1. As compositions of matter, the nitraza diisocyanates having the general formula:

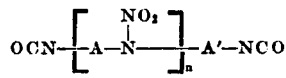

wherein A and A' are lower alkylene radicals and $n$ is a small whole number from 1 to 6 inclusive.

2. As a composition of matter, 3-nitraza-1,5-pentane diisocyanate having the structural formula:

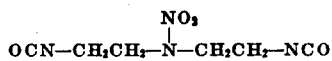

3. As a composition of matter, 3,6-dinitraza-1,8-octane diisocyanate having the structural formula:

4. As a composition of matter, 2-nitraza-1,4-butane diisocyanate having the structural formula:

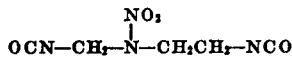

5. As a composition of matter, 3,7-dinitraza-1,9-nonane diisocyanate having the structural formula:

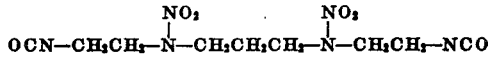

6. As a composition of matter, 3,10-dinitraza-1,12-dodecane diisocyanate having the structural formula:

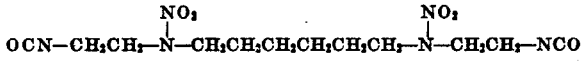

7. As a composition of matter, 3,6,9-trinitraza-1,11-undecane diisocyanate having the structural formula:

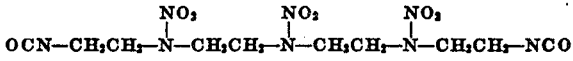

8. As a composition of matter, 2,5-dinitraza-1,6-hexane diisocyanate having the structural formula:

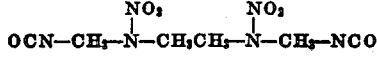

9. The method of preparing nitraza diisocyanates having the general formula:

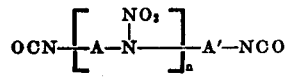

which comprises reacting a nitraza diacyl halide having the general formula:

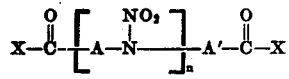

wherein X is a halogen radical, A and A' are lower alkylene radicals, and $n$ is a small whole number from 1 to 6 inclusive; with an azide of an element selected from the group consisting of alkali and alkaline earth metals and subsequently heating the azide thus obtained under anhydrous conditions to effect rearrangement.

10. The method of preparing 3-nitraza-1,5-pentane diisocyanate which comprises reacting 4-nitraza-1,7-heptanedioyl chloride with sodium azide and subsequently heating the azide thus obtained under anhydrous conditions to effect rearrangement.

11. The method of preparing 3,6-dinitraza-1,8-octane diisocyanate which comprises reacting 4,7-dinitraza-1,10-decanedioyl chloride with sodium azide and subsequently heating the azide thus obtained under anhydrous conditions to effect rearrangement.

12. The method of preparing 2-nitraza-1,4-butane diisocyanate which comprises reacting 3-nitraza-1,6-hexanedioyl chloride with sodium azide and subsequently heating the azide thus obtained under anhydrous conditions to effect rearrangement.

13. The method of preparing 3,7-dinitraza-1,9-nonane diisocyanate which comprises reacting 4,8-dinitraza-1,11-undecanedioyl chloride with sodium azide and subsequently heating the azide thus obtained under anhydrous conditions to effect rearrangement.

14. The method of preparing 3,10-dinitraza-1,12-dodecane diisocyanate which comprises reacting 4,11-dinitraza-1,14-tetradecanedioyl chloride with sodium azide and subsequently heating the azide thus obtained under anhydrous conditions to effect rearrangement.

15. The method of preparing 3,6,9-trinitraza-1,11-undecane diisocyanate which comprises reacting 4,7,10-trinitraza-1,13-tridecanedioyl chloride with sodium azide and subsequently heating the azide thus obtained under anhydrous conditions to effect rearrangement.

16. The method of preparing 2,5-dinitraza-1,6-hexane diisocyanate which comprises reacting 3,6-dinitraza-1,8-octanedioyl chloride with sodium azide and subsequently heating the azide thus obtained under anhydrous conditions to effect rearrangement.

No references cited.